United States Patent Office 2,839,568
Patented June 17, 1958

2,839,568

SURFACE ACTIVE POLYETHYLENE AND POLYPROPYLENE IMINE N-ARYL CARBAMATES

Herman S. Bloch, Chicago, Ill., and Donald R. Strehlau, Drexel Hill, Pa., assignors to Universal Oil Products Company, Chicago, Ill., a corporation of Delaware No Drawing. Application June 29, 1954
Serial No. 440,257

1 Claim. (Cl. 260—472)

This application is a continuation-in-part of our co-pending application Serial No. 182,402, filed August 30, 1950, now abandoned.

This invention relates to a process for the manufacture of certain derivatives of alkylaryl isocyanates and to novel compositions of matter containing these products, individual members of this class of products possessing surface activity as well as other useful properties. The alkylaryl isocyanate derivatives of the present invention are particularly useful as detergents, either individually or in admixture with other substantially neutral organic compounds having surface active properties or which enhance the surface activity of the detergent compound.

In accordance with well-established principles concerning the phenomenon of detergency exhibited by certain compounds in aqueous as well as essentially organic solvent solutions, the selection of a suitable compound which will possess surface activity depends upon the choice of the proper chemical groups which when integrated into a composition of well-defined structure and composition will impart a critical balance of hydrophilic and hydrophobic groups in the molecular structure of the resulting compound such that when the latter is dissolved in a suitable solvent, individual molecules of the compound will become oriented in solution with other molecules of the compound to form detergent micelles. In general, the essential structure of compounds which exhibit surface activity or detergency in solution have on one end of the molecule a hydrocarbon group containing a sufficient number of carbon atoms to exert a hydrophobic effect in solution and on the other end a radical having a sufficient number of water-solubilizing groups to exert a hydrophilic effect of sufficient magnitude to substantially balance the effect of the hydrophobic group in solution. Hydrophobic groups heretofore found suitable for incorporation into surface active compounds include the long chain aliphatic radicals generally containing from 10 to about 20 carbon atoms and the alkyl-substituted aryl hydrocarbon groups of both the mono- and polycyclic aryl series, the alkyl substituent for the monocyclic series containing at least 8, up to about 20 carbon atoms per group and for the polycyclic aryl series at least 3, up to about 9 carbon atoms per group. Of the hydrophilic radicals, the carboxy or carboxylate group as represented by the ordinary soaps, the sulfo- or sulfonate group as represented by the alkylaryl sulfonates, and the polyoxyalkylene groups as represented by the poly-ethylene glycol alkylphenylates are some of the hydrophilic radicals present in detergent products heretofore provided. The present invention is directed to surface active compounds of non-ionic or slightly cationic properties which may be structurally considered as alkylaryl hydrocarbons of the mono- and bicyclic series joined through a urethane linkage to a polyalkylenepolyamino chain as the hydrophilic portion of the molecule, both the hydrophilic and hydrophobic radicals of which are critical to the development of surface activity in the resulting compounds. The present products are further characterized as having an alkylaryl group in which the alkyl substituent contains at least 3, up to about 9 carbon atoms in the case of the polycyclic aryl derivatives and at least 8, up to about 20 carbon atoms per alkyl group when the aryl group is monocyclic in character. The hydrophilic group may also be more explicitly characterized as a polyalkylene polyamino substituted urethane radical, said polyalkylene polyamine chain containing at least 5, up to about 150 alkyleneamino units per group.

The present surface active compounds uniformly correspond to the following general structure:

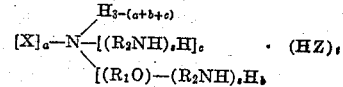

products of the above structure being formed by the condensation of an alkylaryl isocyanate with an alkanol amine, followed by condensing the reaction product with an alkylene imine to introduce the hydrophilic poly-(alkyleneamino) chain into the molecular structure. In the above general formula, X is a urethano group having the structure corresponding to the formula:

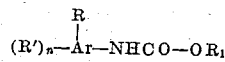

wherein R is the long chain alkyl substituent on the aryl nucleus, Ar, containing from 8 to about 20 carbon atoms when Ar is monocyclic and from 3 to about 9 when Ar is bicyclic, R' is a short chain alkyl group containing from 1 to 2 carbon atoms, $n$ is a number selected from 0, 1, and 2, $R_1$ and $R_2$ are alkylene groups containing from 2 to 5 carbon atoms, $a$ is selected from 1 and 2, $b$ and $c$ are selected from 0, 1, and 2, $b+c$ being at least 1, $a+b$ being a whole number less than 4 and Z is an electronegative radical of an acid which may or may not be associated with the amino nitrogen atoms of the poly-(alkyleneamino) chain, as indicated by the subscript "$t$" which may be 0 or a finite whole number. In order for the resulting product to have surface activity, the total number of alkyleneamino units in each hydrophilic chain, that is, the value of each $s$, must be at least 5 and is preferably not more than about 150, depending upon the size of the hydrophobic hydrocarbon group and the value of subscript $a$ in the above formula. The water-solubilizing poly-alkylenepolyamino chain in the structure of the product may be formed in situ by reacting the urethane intermediate with the alkylene imine monomer, or may be formed by an inter-condensation reaction of the alkylaryl urethane with an alkylene imine polymer containing the desired number of alkylene imine units, the polymer being formed in a reaction preceding the condensation with the urethane intermediate.

One object of this invention is to provide a novel class of organic compounds utilizable as surface active agents in aqueous solution and, by variation in the molecular composition of the product, to provide a class of compounds having surface activity in non-aqueous or organic solvents. Another object of this invention is to provide a detergent product which is solid at normal temperatures, which may be molded into bars consisting substantially of the present detergent product or composited with other substantially neutral anionic, ionic or non-ionic detergents. Another object of this invention is to provide detergents in solid form which possess the wax-like consistency and other physical properties of soap and are capable of lathering to form mucilaginous dispersions of the detergent in a solvent, but which, on the other hand, unlike soap, do not precipitate insoluble calcium or magnesium curd when dissolved in hard water containing calcium or magnesium ions in solution. A further object of this invention is to prepare a substantially non-ionic or only slightly cationic surface active agent soluble in water and compatible with other cationic, anionic or non-ionic surface active agents.

In one of its embodiments this invention relates to essentially organic compounds having the following general formula:

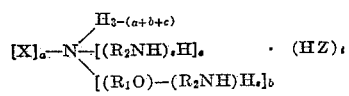

in which Formula X is a urethano group having the structure corresponding to the formula:

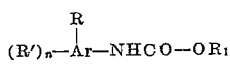

wherein Ar is a poly-substituted aryl hydrocarbon group selected from the mono and bicyclic aromatic hydrocarbons, R is an alkyl group containing from 8 to about 20 carbon atoms when Ar is monocyclic and from 3 to about 9 carbon atoms when Ar is bicyclic, R' is an alkyl group containing from 1 to 2 carbon atoms, $n$ is a whole number selected from 0, 1, and 2, $R_1$ and $R_2$ are independently selected from alkylene containing from 2 to 5 carbon atoms, $s$ is a whole number selected from 5 to about 150, $a$ is selected from 1 and 2, and $b$ and $c$ are selected from 0, 1, and 2, $b+c$ being at least 1, $a+b+c$ being a whole number less than 4, Z is an acid-derived anion and "$t$" is selected from 0, 1, and a whole number having a value selected from 1 to $1+s(b+c)$.

Another embodiment of the invention is directed to a process for preparing a surface active agent which comprises reacting an alkylarylamine having a single aryl substituent on the aryl nucleus containing from 8 to about 20 carbon atoms when the aryl group is monocyclic and from 3 to 9 carbon atoms when the aryl nucleus is bicyclic with carbonyl chloride, thereafter reacting the resulting N-alkylarylisocyanate with an alkanolamine selected from the mono-, di-, and trialkanolamines containing from 2 to 5 carbon atoms per alkanol group and condensing the resulting product with a compound selected from the group consisting of an alkylene imine and a polyalkylenepolyamine in which the alkylene group contains from 2 to about 5 carbon atoms and continuing the reaction until the condensation product contains from about 5 to about 150 alkylene amino units per molecule.

As heretofore indicated, the size of or the number of carbon atoms in the hydrophobic alkylaryl portion of the present product and the number of alkyleneamino units in the polyalkylenepolyamino radical constituting the hydrophilic chain substituted on the aryl nucleus must be maintained within defined limitations in order for the resulting product to possess surface active properties, particularly the property of detergency in aqueous or non-aqueous solvents. In general, the size of the hydrophobic and hydrophilic groups must be within certain defined limits to provide a product in which the hydrophobic group substantially balances the effect of the hydrophilic group in solution, such critical size relationship being apparently essential to the formation of the micelle structure when the product is dissolved in a solvent.

In the usual and preferred process of producing the present surface active products the starting material is the alkylaryl hydrocarbon which constitutes the hydrophobic portion of the product molecule on which the isocyanate radical is subsequently introduced, followed by the step-wise condensation of the resulting alkylaryl isocyanate which an alkanol amine to provide an intermediate product containing an active hydrogen atom residing in either a terminal hydroxyl group or a primary or secondary amino group, in either of which the amino or hydroxyl hydrogen atom is present which is capable of subsequently reacting by condensation with an alkylene imine or with a polyalkylene polyamine to form a hydrophilic polyalkylenepolyamino chain. Although the invention is particularly directed to the monocyclic alkylaryl derivatives herein provided, in which the alkyl group contains from 8 to about 20 carbon atoms, certain alkyl-substituted derivatives of the bicyclic aryl hydrocarbons of the naphthalene and biphenyl series also provide effective hydrophobic groups from which the present detergent products may be synthesized. In the bicyclic aryl hydrocarbon series, the nuclear alkyl substituent contains at least 3 and preferably not more than about 9 carbon atoms in order to provide a hydrophobic alkylaryl hydrocarbon group of the proper degree of hydrophobic effectiveness to yield detergent compounds when integrated with the hydrophilic radical of the present composition. Some of the preferred hydrocarbon starting materials of the present process are the alkylaryl hydrocarbons formed by alkylation of the aromatic ring with propylene polymers, particularly the dimers, trimers, tetramers, and pentamers, although alkylates formed by condensation of the aromatic hydrocarbon starting material with chlorinated paraffins, alcohols, etc. are also utilizable as the starting materials. Typical of the propylene polymer alkylates utilizable herein as the initial starting material in the complete synthesis of the present products are such hydrocarbons as nonylbenzene, dodecylbenzene, pentadecylbenzene and octadecylbenzene, the corresponding ortho-, meta-, and para-, nonyl-dodecyl-, and pentadecyl toluenes, xylenes, ethylbenzenes, and ethyltoluenes of the mono-nuclear aromatic series, hexylnaphthalenes, nonylnaphthalenes, hexylphenylbenzenes, as well as the alkylates formed from shorter chain olefins such as di-isopropylnaphthalene, butylnaphthalene, isobutylnaphthalene, t-butylnaphthalene, amylnaphthalene, octylnaphthalene, amylmethylnaphthalene, isopropylphenylbenzene, p,p'-diisopropylphenylbenzene, t-butyl-dimethylphenylbenzene and others of the bicyclic aryl hydrocarbon series. The surface active products prepared from the monocyclic or benzenoid series of aromatic hydrocarbons are particularly preferred as general detergents and emulsifying agents for aqueous systems because of their more desirable physical properties which enable these compounds to be utilized for a greater variety of effective detergent purposes than the corresponding alkyl bicyclic aryl derivatives which are generally less soluble in water and are of higher melting point than the alkylbenzene derivatives. The alkylaryl hydrocarbon starting materials are formed by the well-known alkylation process of the art, preferably being formed by the alkylation of the aryl hydrocarbon with an olefinic hydrocarbon alkylating agent in the presence of an acid-type catalyst at reaction conditions which promote the formation of the mono-substituted long chain alkylaryl hydrocarbon.

When the synthesis of the present surface active products is initiated with the alkylaryl hydrocarbon starting material, a procedure which is generally applicable to the mono- or bicyclic alkylaryl hydrocarbons for the production of the present surface active products comprises the following series of successive reaction steps: (1) subjecting the long chain alkyl-substituted aryl hydrocarbon to nitration under reaction conditions which yield a mononitrated product in which the nitro group is substituted on one of the nuclear aryl positions, (2) selectively reducing the nitro group of the resulting nitro alkylaryl hydrocarbon by hydrogen reduction to form the corresponding amino-substituted alkylaryl compound, (3) reacting the alkylarylamine with phosgene (carbonyl chloride) to form the corresponding alkylaryl isocyanate which has the following empirical structure:

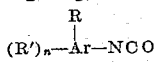

(4) thereafter reacting the isocyanate intermediate with an alkanol amine selected from the mono-, di-, and trialkanolamines having from 2 to 5 carbon atoms in their alkanol groups under reaction conditions such that upon completion of the resulting condensation reaction the compound formed by the reaction contains an active hydrogen atom residing in either an unreacted primary or secondary amino group or in an hydroxyl group, the latter groups being capable of further condensing with an alkylene imine to form a long chain polyalkylenepolyamino chain which constitutes the essential hydrophilic group in the surface active product, and (5) reacting the product of the preceding intermediate condensation with an alkylene imine or with an alkylene imine polymer herein referred to as a "polyalkylenepolyamine" under conditions which result in the inter-condensation reaction of the alkylene imine reactant with the intermediate product to form the long chain polyalkylenepolyamino radical containing from 5 to about 150 alkyleneamino units per chain. The product resulting from the above series of reactions, which is the product of this invention corresponds in its general structure to the formula heretofore described.

In the synthesis of the present products starting from the alkylaryl hydrocarbon, the nitration of the aromatic ring may be effected by any of the commonly known methods of nitration which yield the mono-substituted nitro product, normally effected by reacting the alkylaryl hydrocarbon with concentrated nitric acid, usually in the presence of a dehydrating agent such as concentrated sulfuric acid. The selective reduction of the nitro group of the resulting mononitrated product is also effected by well-known means, such as reduction with hydrogen generated by zinc and hydrochloric acid, iron an hydrochloric acid, or by catalytic reduction, effected, for example, by passing the mononitroalkyl-aromatic hydrocarbon in the presence of hydrogen over a supported nickel, cobalt, or platinum catalyst, among others for this purpose. The conversion of the alkylarylmonoamine to the corresponding isocyanate intermediate may also be accomplished in accordance with well-known procedures therefor, for example, by reaction of the amine with carbonyl chloride (also referred to as "phosgene") at temperatures sufficient to maintain the reactants in substantially liquid phase and to effect the carbonylation of the amino group. Although the preferred method of forming the isocyanate comprises the aforementioned nitration, reduction and reaction of the amine with carbonyl chloride, other methods for converting the alkyl aromatic hydrocarbon to the mono-isocyanate derivative may be used.

The treatment of the alkylaryl isocyanate intermediate to form the final surface active product of this invention depends upon the product desired from the present process and particularly upon the use to be made of the product. In the reaction of the present alkylaryl isocyanate with an alkanol amine to form the intermediate product referred to herein the reaction is believed to result primarily in the formation of a urethane linkage involving the condensation of the isocyanate radical with the hydroxyl group of the alkanol amine; that is, the one or more hydroxyl groups of the mono- or polyalkanolamine are believed to be more reactive in the condensation reaction with the isocyanate than the amino group thereof, although the intermediate may not necessarily consist exclusively of urethane linkages. The general formula which is believed to represent a major proportion of the intermediate product of this invention prior to condensation with the alkylene imine or polyalkylenepolyamine reactant is as follows:

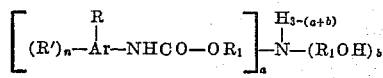

in which the values of $a$ and $b$ vary, depending upon whether a mono-, di-, or trialkanolamine is involved in the condensation reaction with the isocyanate, and whether 1 or 2 mols of isocyanate react per mol of alkanolamine. The use of a mono-alkanolamine in the condensation reaction with the alkylaryl isocyanate produces an intermediate believed to consist primarily of a urethane product in which the subscript "$a$" of the above formula has a value 1 and $b$ is 0, the intermediate product having the following structure:

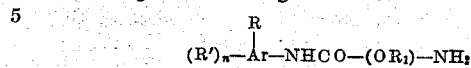

the product containing a terminal primary amino group condensable with the alkylene imine or polyalkylene polyamine reactant herein provided to form a hydrophilic radical containing one or two polyalkylenepolyamino chains per molecule. In the condensation of a dialkanolamine with the alkylaryl isocyanate to form the present intermediate product, the reaction may involve one or two molecules of the isocyanate per molecule of dialkanolamine, if sufficient isocyanate is available in the reaction mixture, to form an intermediate product containing one or two hydrophobic alkylaryl groups attached by urethane linkages to the hydroxyl groups of the dialkanolamine as shown in the following empirical formula representing the structure of the intermediate:

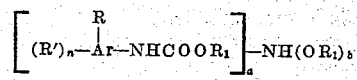

the value of $a$ in the above general formula being 1 or 2 and $b$ being 1 or 0. The diurethane intermediate product is believed to be formed as a principal product when at least two moles of the alkylaryl isocyanate are charged to the condensation reaction per mole of dialkanolamine and when less than two moles of the former reactant are utilized per mole of isocyanate, the intermediate product is believed to be a mixture of products having mono- and diurethano linkages. If equimolar ratios of the reactants or a molar excess of alkanolimine are utilized in the intermediate condensation, the product is believed to consist primarily of mono-urethanes. In each instance, however, the resulting intermediate products contain terminal secondary amino radicals condensable in the subsequent condensation reaction with the alkylene imine or polyalkylenepolyamino reactant to form the final product of this invention. The products containing two urethane linkages (that is, two hydrophobic alkylaryl groups) generally possess surface activity but are not highly effective detergent products. The condensation of the alkylarylisocyanate reactant with a trialkanolamine reactant to form the intermediate product is also believed to contain at least one urethane linkage, depending upon the molar ratio of isocyanate to alkanolamine reactants charged to the intermediate condensation reaction. Although trialkanolamines contain three hydroxyl groups per molecule each of which may theoretically undergo condensation with a molecule of the isocyanate, the presence of the relatively large alkylaryl radical on the isocyanate reactant limits via steric hindrance the number of isocyanate units may possibly react with the trialkanolamine to not greater than two, and an intermediate product of the following structure is believed to be formed:

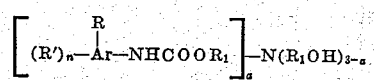

in which $a$ is one or two, the resulting intermediate product containing one or two terminal hydroxyl groups, the active hydrogen atoms of which are capable of undergoing condensation with the alkylene imine or polyalkylenepolyamine reactant in the final stage of the present synthesis to form the hydrophilic polyalkylenepolyamino chains. In the latter reaction steric hindrance does not apparently limit or control the reactivity of the essentially aliphatic alkylene imine with the terminal hydroxyl group, such that upon contacting the intermediate alkylaryl isocyanate-trialkanolamine reaction product with the alkylene imine or alkylene imine polymer in the final stage of the present process at condensation reaction conditions, the reaction proceeds to finality, accompanied by the introduction of the hydrophilic polyalkylenepolyamino radical into the structure of the product.

Suitable alkanolamines utilizable in the intermediate reaction include such compounds containing from 2 to 5 carbon atoms in the alkanol residue of this reactant, including the mono-, di- and trialkanolamines, such as aminoethanol, diethanolamine, triethanolamine, aminopropanol, dipropanolamine, isopropanolamine, one or more of the aminobutanols or an aminopentanol isomer in which the hydroxyl group may occupy various positions on the alkylene chain thereof relative to the amino group. The condensation of the alkylaryl isocyanate with the alkanolamine occurs generally at temperatures of from about 0° to about 150° C. and occurs spontaneously or may be catalyzed by a basic catalyst, such as a small amount of sodium carbonate, sodium acetate, sodium hydroxide, or other alkali metal base or basic-acting salt, pyridine, quinoline, a trialkyl ammonium hydroxide, or a lithium, sodium or potassium alcoholate, such as sodium methanolate. The resulting reaction forms predominantly an N-alkylarylcarbamic acid ester of the alkanolamine, which, in the case of utilizing monoethanolamine, one of the preferred alkanolamines of this invention, yields a product having the following structure:

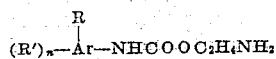

the product containing an amino group bearing an active hydrogen atom which enters into the subsequent condensation reaction with the alkylene imine to form the polyalkylenepolyamino hydrophilic portion of the present surface active product.

The reactants referred to herein as the alkylene imines which upon condensation with the urethane intermediate product (i. e. the reaction product of the alkylarylisocyanate and the alkanolamine) introduce the water-solubilizing polyalkylenepolyamino chain into the structure of the resulting compound, are cyclic compounds corresponding to the general formula:

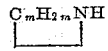

wherein $m$ is a whole number having a value of from 2 to 5; or, more specifically, to the formula:

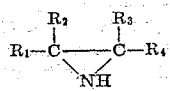

wherein $R_1 \ldots R_4$ are independently chosen from hydrogen and alkyl groups, and the sum of the number of carbon atoms in $R_1 \ldots R_4$ does not exceed three. Thus, monomeric alkylene imines such as ethylene imine, propylene imine, and n-butylene imine, one or more of the isobutylene imines, and one or more of the amulene imine isomers may be utilized individually or in admixture in the final condensation reaction to form the present products.

Instead of utilizing the alkylene imine monomer itself in the final condensation reaction to form the ultimate surface active product of this invention, the alkylene imines may be polymerized or condensed with ammonia (i. e. inter-condensed) in a reaction preceding their condensation with the isocyanate-alkanol amine intermediate product to their desired molecular weight to yield a polyalkylenepolyamine which is readily soluble in water and which when condensed with the isocyanate alkanolamine intermediate condensation product introduces the hydrophilic group essential to the development of surface activity in the resulting product. In the preferred process of effecting the introduction of the polyalkylenepolyamino chain into the structure of the product, the alkylene imine monomer is charged directly to the condensation reaction with the isocyanate-alkanolamine intermediate reaction product to form the present product. The polyalkylenepolyamines formed by inter-condensation of the alkylene imine monomer may also be polymerized in a preliminary reaction in the presence of ammonia to form a polyalkylenepolyamino chain containing terminal amino groups on both ends of the polyalkylenepolyamino chain which may undergo condensation with the isocyanate-alkanolamine reactant in the formation of the present surface active agent.

The condensation of the alkylene imine or polyalkylenepolyamine with the intermediate condensation product of the alkylaryl isocyanate and the alkanolamine to introduce the polyalkylenepolyamine hydrophilic radical into the compound may be effected thermally at a reaction temperature of from about 30° to about 200° C., preferably at temperatures of from about 50° to about 150° C. The condensation reaction may be promoted by the presence of a catalyst selected from the mineral acids in the reaction mixture, the acid also forming the acid ammonium salt of the amino groups present in the product. The reaction rate and completion of the condensation reaction is also promoted by excluding moisture from the reaction mixture, such as the moisture introduced by reagents containing small amounts of dissolved water. In many instances it is also desirable to conduct the condensation reaction in the presence of a solvent of one or more of the reactants, the solvent being generally selected from certain hydrocarbons, preferably aromatic hydrocarbons, such as benzene, toluene, etc., chlorohydrocarbons, such as chlorobenzene, etc., and ethers such as diethyl ethers, dibutyl ether, etc., particularly solvents having boiling points corresponding to the desired reaction temperature. The condensation of the alkylene imine and the isocyanate-alkanolamine intermediate may also be conducted at a superatmospheric pressure sufficient to maintain the reactants and/or solvent in substantially liquid phase during the course of the reaction, pressures up to about 30 atmospheres generally being sufficient for this purpose.

In the condensation of the alkylene imine reactant with the intermediate urethane-type compound formed by the intermediate condensation of the alkylaryl isocyanate with the amino alkanol, the surface active product has the following general structure:

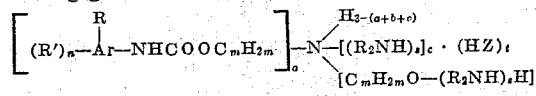

wherein $C_mH_{2m}$ represents the alkylene group of the alkanol amine reactant involved in the formation of the intermediate urethane containing from 2 to 5 carbon atoms, $b+c$ represents the number of alkanol groups in the alkanol amine reactant, being from 1 to 3, and $R_2$ represents the alkylene group of the alkylene imine or polyalkylenepolyamine reactant. The molar proportion of alkylene imine or polyalkylenepolyamine to the alkylarylisocyanate condensation product of the alkanolamine charged to the condensation reaction is sufficient to form a polyalkylenepolyamine chain having hydrophilic properties and for this purpose, at least 5 moles of the alkylene imine monomer or an alkylene imine polymer containing at least 5 alkyleneamino units per molecule must be charged into the reaction mixture with the alkylarylisocyanate-alkanolamine condensation product. Products having detergent properties generally contain at least 10 and preferably from 15 to 25 alkyleneamino units per molecule and in order to provide a polyalkylenepolyamino chain of such length, a corresponding quantity of alkylene imine or a polyalkylenepolyamine of such chain length must be provided in the final condensation reaction. The latter reaction is also promoted by the presence of a mineral acid catalyst in the reaction mixture which forms the tetravalent ammonium salt of the amino groups present in the compound. The condensation of these reactants also occurs at the reaction conditions hereinabove specified, that is, at temperatures of from about 30° to about 200° C.

The surface active products of this invention vary in their general physical properties, particularly their physical form and melting points, depending upon the reactants involved in the condensation reaction and more particularly, upon the molecular weight of the alkylarylisocyanate reactant (i. e. the chain length of the alkyl substituent thereof) and also upon the chain length of the polyalkylenepolyamino radical, the latter factor being determined by the number of mols of alkylene imine condensed with the isocyanate-alkanolamine intermediate product or upon the number of alkyleneamino units in the polyalkylenepolyamine reactant, if utilized in the final condensation reaction. In the case of the low molecular weight alkylene imines, such as ethylene imine and the condensation products containing relatively few alkylene amino units in the hydrophilic chain, generally up to about 15, the product may be a viscous liquid which is only partly soluble in water but soluble in organic solvents such as hydrocarbons, esters and alcohols. As the number of alkylene amino units in the polyalkylenepolyamino chain increases, by increasing the number of mols of alkylene imine charged into the condensation reaction, the products become more soluble in water and are of higher melting points. These products generally acquire wax-like or soap-like characteristics as the number of alkyleneamino units per molecule increases. The latter materials form stable colloids when dissolved in water, and have many of the desirable physical properties of fatty acid soaps, such as the characteristic mucilaginous quality of soap solutions.

The present products, which form non-ionic or slightly cationic micelles in aqueous solution, are compatible in admixture with cationic, anionic and other non-ionic detergents. They may be composited with other types of detergents either in liquid or solid form and are thus particularly desirable for the manufacture of neutral or slightly alkaline, non-irritating detergents in bar form, either individually or in admixture with an anionic, cationic or other non-ionic, substantially neutral, organic detergent. In general, the composition preferably contains a major proportion of the present detergents in order to impart the desired soap-like "feel" to the composition. Builder salts, such as sodium sulfate, sodium polyphosphate, sodium silicate, and others well-known in the art, as well as extenders, abrasives, perfumes, water-softening compounds, soil-suspending agents, and other materials having a specific action in detergent use may be composited with the present products to enhance their detergent and cleansing properties or their customer appeal.

In some instances it becomes desirable for certain purposes to convert a water-insoluble product to a water-soluble product and in such instances any free amino groups or hydroxyl groups which did not enter into the condensation reaction with the isocyanate reactant may be converted to derivative salts or esters to promote the water-solubility of the resultant condensation. Thus, a free amino group may be converted to the corresponding ammonium chloride or ammonium sulfate salt which is more soluble in water than the original amino-substituted product. Although mineral acids, in general, such as sulfuric acid, hydrochloric acid, phosphoric acid, etc. are preferred for converting at least a portion of the amino groups to their ammonium derivative groups of the acid anion utilized, other acids, including the lower fatty acids, such as acetic acid may also be utilized for this purpose. In a similar manner, the product containing free hydroxyl groups may be converted into more water-soluble derivatives by reaction with sulfuric acid to form a sulfate ester which may be used as such in an aqueous system or converted to an alkali metal salt thereof to form a substantially neutral anionic detergent product. Likewise, a water-soluble product may be converted to a water-insoluble material by converting the free amino and/or hydroxyl groups of the product to the corresponding ester or amide derivatives of appropriately selected organic acids.

The present invention is further illustrated with respect to specific embodiments thereof in the following examples. In thus providing specific illustrations of the invention it is not thereby intended to limit the generally broad scope of the invention in strict accordance therewith.

EXAMPLE I.—PRODUCTION OF ALKYLARYL HYDROCARBON STARTING MATERIAL

A series of alkyltoluene and alkylnaphthalene hydrocarbons was prepared to provide the initial starting material in the production of the present alkylaryl isocyanate intermediates from which various surface active products were prepared by the procedure hereinafter described. Alkyltoluene hydrocarbons in which the alkyl groups are hexyl, nonyl and dodecyl and alkylnaphthalenes in which the alkyl groups are amyl and octyl were prepared by alkylating toluene in the presence of an acidic condensation catalyst with olefinic alkylating agents comprising propylene polymer fractions containing, respectively, a predominant proportion of hexylene, nonylene and dodecylene as the corresponding alkylating agents for toluene and n-amylene and n-octylene (prepared by dehydrating n-amyl alcohol and n-octanol, respectively) for naphthalene. The following procedure describes the method of preparing nonyltoluene, the procedure, reaction conditions, molar ratios, alkylation catalyst and other factors for the alkylation reaction being substantially similar in all respects for the alkylation of naphthalene with amylene and octylene and for the alkylation of toluene with hexylene and dodecylene as for the herein described alkylation of toluene with nonylene. The boiling points and analyses of the alkylates for each of said hydrocarbon alkylates varied in accordance with their molecular weights.

*Preparation of nonyltoluene*

750 grams (8.15 mols) of toluene was charged into a 5-liter alkylating flask fitted with a mechanical stirrer, two dropping funnels and a cooling bath which reduced the temperature of the toluene to 5° C. 630 grams (6.85 mols) of toluene and 630 grams (5 mols) of the nonylene fraction of a propylene polymer product (boiling point at 760 mm. Hg pressure: 130 to 145° C.) were mixed, cooled to 5° C. and charged into one of the dropping funnels. 800 cc. of cooled, 98.5% sulfuric acid was charged to the other dropping funnel and the two materials thereafter simultaneously introduced into the alkylating flask where the mixture was efficiently stirred at a temperature of approximately 5° C. over a period of 3 hours. Upon settling, the reaction mixture separated into two layers and the lower acid layer was decanted and discarded. The upper hydrocarbon layer was washed with water and sodium bicarbonate, dried and subjected to fractional distillation. The fraction having a boiling range of from about 270° to about 280° C. was separated as the nonyltoluene product, the fraction having the indicated boiling range weighing 846 grams. Analysis of the above alkylate fraction for carbon and hydrogen indicated that the product separated from the reaction mixture as indicated corresponded to the theoretical analysis for nonyltoluene, $C_{16}H_{26}$, within the limits of experimental error.

*Preparation of alkylarylisocyanate derivatives of alkylaryl hydrocarbons*

A. *Mono-nitrononyltoluene.*—In the case of each of the above toluene and naphthalene alkylates, that is, the hexyltoluene, nonyltoluene, dodecyltoluene, amylnaphthalene, and octylnaphthalene, the isocyanate derivatives thereof were prepared in accordance with a uniform procedure for each alkylate, the procedure involving initially nitrating the alkylate hydrocarbon to produce the mononitro-substituted intermediate, reducing the nitro group of the product to form the corresponding alkyltoluidines and alkylnaphthylamines, and reacting the latter products with phosgene (carbonyl chloride) to form the corresponding isocyanate groups. Since a similar procedure was utilized to prepare the isocyanate derivatives for each of the toluene and naphthalene alkylates, the basic method involved will be described for the preparation of nonyltolylisocyanate, the method being repeated as to its basic procedure for the preparation of the other toluene and naphthalene alkylates.

A mixture of 181 grams of concentrated nitric acid (specific gravity 1.42) and 280 grams of 98.5% sulfuric acid was cooled to 10° C. and then added dropwise over a period of three hours with efficient stirring to 327 grams (1.50 mols) of nonyltoluene contained in a 1-liter reaction vessel placed in a cooling bath of a mixture of salt and ice, which controlled the reaction temperature during this period at approximately 0–3° C. The cooling bath was then removed and the heat of reaction raised the temperature to 50° C. where it was maintained an additional two hours, accompanied by stirring.

After cooling, the organic layer was separated from the acid layer, diluted with an equal volume of pentane, washed with water and sodium bicarbonate and dried over calcium chloride. The pentane solvent was removed by distillation at atmospheric pressure and the remaining high-boiling material was fractionally distilled at a pressure of 2–3 mm. Hg absolute. The fraction boiling from 143° to 148° C. at 2 mm. pressure, having a refractive index ($n_D^{20}$) of 1.5175, was separated; it weighed 302 grams. Analysis of this fraction for nitrogen and comparison of the result with the thoretical nitrogen content for the pure compound resulted in the following data:

*Nitrogen analysis.*—Calculated for $C_{16}H_{25}NO_2$: N, 5.32%. Found: N, 5.25%.

B. *Nonyltoluidine.*—The procedure employed for the reduction of the nitro group of mono-nitrononyltoluene was substantially similar to the procedure employed for reduction of the nitro group of the corresponding mono-nitrohexyltoluene, mono-nitrododecyltoluene, mono-nitroamylnaphthalene, and mono-nitro-octylnaphthalene derivatives. The reduction of the nitro group only of the mono-nitrononyltoluene without reduction of the aryl nucleus thereof was effected in accordance with the following procedure: 300 grams (1.14 mols) of mono-nitrononyltoluene, dissolved in 200 cc. of absolute ethanol, was charged with 30 grams of a nickel-kieselguhr catalyst into a 3-liter pressure autoclave containing a glass liner, sealed, and pressured to 100 atmospheres of hydrogen. The bomb was rotated at 25° C. for 7 hours during which time the pressure was maintained substantially constant. Following the above reduction period, the batch was removed, the catalyst filtered from the liquid product and the ethanol recovered by distillation at atmospheric pressure. The higher boiling bottoms material was fractionated at a pressure of about 2–3 mm. Hg absolute pressure. The recovered nonyltoluidine fraction boiling from 123 to 128° C. at 2 mm. Hg pressure was collected from the overhead distillate. Its refractive index ($n_D^{20}$) was 1.5230, its specific gravity was 0.9284 and the product yield was 96.5% of theoretical. The product had an observed molecular refraction of 76.7, compared to the theoretical value for nonyltoluidine of 76.8. Analysis of the product compared with the calculated nitrogen content indicated the following results:

*Nitrogen analysis.*—Calculated for $C_9H_{27}N$: N, 6.01%. Found: N, 6.01%.

*Preparation of alkylaryl isocyanates*

The following procedure for the preparation of nonyltolylisocyanate from nonyltoluidine is substantially the same as that employed for the preparation of the corresponding hexyl- and dodecyltolylisocyanates and the amyl- and octylnaphthalene isocyanates utilizing the respective hexyl- and dodecyltoluidines and the amyl- and octylnaphthalenes as starting materials, the recitation of the procedure for nonyltoluene being merely illustrative of the general procedure also applicable to the other members of the above group of alkylates utilized herein. The procedure in each instance consisted essentially of reacting the alkyltoluidine or alkylnaphthylamine with phosgene (carbonyl chloride) in the presence of an inert solvent, and thereafter fractionally distilling the product to separate the desired alkylarylisocyanate product.

*Nonyltolylisocyanate.*—Anhydrous ethyl acetate (375 mols) was placed in a 3-liter flask and saturated with carbonyl chloride by bubbling the latter into the solvent at room temperature. A solution of 175 grams (0.750 mol) of nonyltoluidine in 1125 cc. of ethyl acetate was added dropwise to the saturated solution of phosgene in ethyl acetate over a period of five hours while an additional quantity of carbonyl chloride was bubbled into the reaction mixture which was maintained in a turbulent state by efficient stirring. The mixture was then heated by means of a steam bath and the bulk of the ethyl acetate was distilled overhead at a slightly sub-atmospheric pressure. The remaining product was distilled at 2 mm. Hg absolute pressure and fractions of the product were collected. A fraction boiling from 122 to 126° C. at 2 mm. pressure, amounting to 178.3 grams or a theoretical yield of 92%, was separated as the nonyltolylisocyanate product. The observed molecular refraction for the product was 80.6, compared to a theoretical value of 82.2; its index of refraction ($n_D^{20}$) was 1.5142, its specific gravity was 0.9675 and its nitrogen analysis is indicated as follows:

*Analysis.*—Calculated for $C_{17}H_{25}NO$: 5.40%. Found: 5.57%.

*Condensation of alkylaryl isocyanate with amino-substituted water-solubilizing organic compounds*

A. *Condensation of dodecyltolylisocyanate with ethanol amine.*—6.1 grams of mono-ethanolamine (0.1 mole) was dissolved in 25 cc. of chloroform and dried over anhydrous calcium sulfate. The dried solution was then placed in a reaction vessel and mixed with dodecyltolyl isocyanate (30.2 grams or 0.1 mol) dissolved in 200 cc. of chloroform added dropwise at room temperature with stirring. As the isocyanate was added, the reaction mixture became spontaneously warm from the resulting reaction. The reaction was allowed to continue for an additional 3 hours, followed by vaporization of the chloroform from the mixture and vacuum distillation (at 2 mm. Hg pressure) of the residue. Small amounts of unreacted ethanolamine were removed from the reaction mixture by dissolving the latter in chloroform and extracting the ethanolamine from the solution in three aliquots of water. The extracted chloroform solution of the product was dried over anhydrous calcium sulfate and the desired product recovered by evaporation of the chloroform from the dried solution. The product, residue of the evaporation, was a yellow liquid only very slightly soluble in warm water. It is believed to be principally a mixture of two or more compounds (A and B), of the following structures in which ($R_1RAr$—) is dodecyltolyl, although compound (A) is believed to be the predominant product:

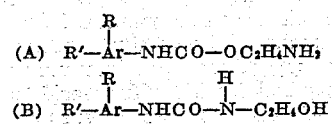

Small amounts of the products resulting from condensation of two mols of isocyanate with one of ethanolamine may also have been present. The above product has no detersive activity and is insoluble in water, having no hydrophilic radical of sufficient effectiveness to solubilize the product in water.

A water-soluble, surface active product, having detergency in aqueous solution was prepared from the above product or mixture of compounds by reaction with ethylene imine. For this purpose, aliquot samples of a larger batch of the product were each reacted with varying proportions of ethylene imine to yield products containing an average of 3, 8, 10, 18 and 36 ethylene imine units per molecule. A mixture of 0.1 mole of the ethanolamine-dodecyltolylisocyanate condensation product, (molecular weight based upon Formula A, above), 10 grams of sodium carbonate and 0.3, 0.8, 1.0, 1.8 and 3.6 moles of ethylene imine, respectively, were charged into the glass liner of a rotating autoclave in successive runs and each heated to 50° C. at the existing pressure in the autoclave for 3 hours while the reaction mixture was stirred by rotation of the autoclave. The reaction products in each case were removed from the autoclave and tested for water solubility and detergency. The products varied from viscous liquids (product containing 3 ethyleneamino units per molecule) to pasty solids (product containing 8 and 10 units of ethylene imine) to solid wax-like materials in the case of the products containing an average of 18 and 36 units of ethylene imine. Each product had surface activity as evidenced by the depression of the surface tension of water in which each was at least partially soluble, the product containing an average of 18 ethylene imine units having the greatest detergency. The products containing 8, 10, 18 and 36 ethylene imine units were completely soluble in both hot and cold water at all concentrations below 5% by weight. The detergency of the product containing 18 ethyleneamino units as measured by comparison with equivalent concentrations of sodium dodecylbenzene sulfonate in a standard Launder-O-Meter procedure under equivalent test conditions is approximately 150% the detergency of the above indicated reference detergent at concentrations of 0.2% of each detergent in aqueous solution.

In a similar series of experiments in which phenylisocyanate and hexyltolylisocyanate were condensed with ethanolamine and the resulting intermediate products condensed with 10 molar proportions of ethylene imine, the product prepared from phenylisocyanate has only slight surface activity and no apparent detersive activity, while the product prepared from hexyltolyl isocyanate, although exhibiting considerable surface activity was only slightly effective as an aqueous detergent.

B. *Condensation of dodecyltolylisocyanate with diethanolamine and propylene imine.*—10.5 grams of diethanolamine (0.1 mol) was dissolved in 25 cc. of chloroform and dried over calcium sulfate. The dried solution was then placed in a reaction vessel and mixed with dodecyltolylisocyanate (15.1 grams—0.05 mole) added dropwise at room temperature, accompanied by efficient stirring. As the isocyanate reactant was added to the solution, the latter became spontaneously warm from the resulting reaction. The reaction mixture was stirred an additional two hours and the solvent was thereafter removed by distillation on a water bath and subsequent distillation at 2 mm. Hg absolute pressure. Unreacted diethanolamine was removed by dissolving the product in 100 cc. of chloroform and extracting the resulting solution three times with 20 cc. portions of water. The residue, consisting of 21 grams of slightly yellow liquid, was insoluble in water. The product was also insoluble in dilute hydrochloric acid.

Some of the structural configurations for the possible individual components present in the product include compounds having the following empirical formulas (A, B, C, D) in which R'RAr— represents the hydrophobic dodecyltolyl radical, although it is believed that compound (A) predominates in the product.

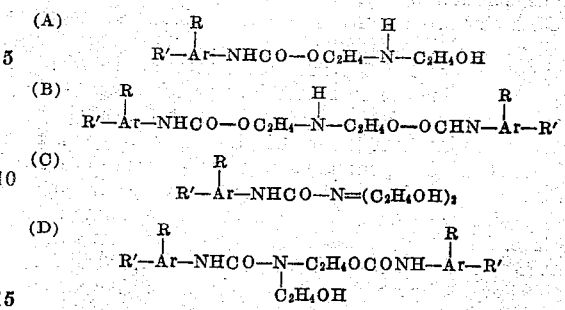

The intermediate product of the above reaction comprising the residue recovered by evaporation of the chloroform solvent therefrom is converted into a water-soluble surface active agent by reaction of the intermediate with propylene imine utilizing sufficient imine in the reaction mixture to form a hydrophilic polypropylene polyamine chain. For this purpose, the dodecyltolylisocyanate condensation product of diethanolamine, prepared as indicated above is charged, together with 24 molecular proportions of propylene imine and 1 percent of powdered sodium hydroxide catalyst into a rotating pressure autoclave, 21 grams (0.05 mole based upon Formula A, above) of the intermediate product and 69.5 grams of the propylene imine being utilized in the reaction. The autoclave was thereafter heated for six hours at 90° C. as the autoclave was rotated to mix the reactants. During the ensuing reaction, the temperature temporarily increased to about 135° C. as the result of the exothermic reaction. Following the above period of reaction, the reaction product was heated to 120° C. and the molten product decanted from the residue of catalyst. On cooling slightly, the product solidified to a solid, wax-like material which produced a profusion of lather when shaken with water, and had excellent emulsifying properties. When tested for its detergent properties, the product has a detersive action in aqueous solution greater than sodium dodecylbenzene sulfonate at equivalent concentrations and under equivalent test conditions.

C. *Condensation of dodecylisocyanate with triethanolamine and ethylene imine.*—149 grams of triethanolamine (0.1 mole) was dissolved in 50 cc. of chloroform and the resulting solution dried over anhydrous calcium sulfate. The dried solution was then placed in a reaction vessel and mixed with 30.1 grams (0.1 mole) of dodecyltolylisocyanate dissolved in 100 cc. of chloroform, added dropwise at room temperature, accompanied by stirring of the reaction mixture. The temperature of the reaction mixture increased spontaneously as the isocyanate was added to the triethanolamine and following the complete addition of isocyanate (after 3.5 hours) the mixture was stirred an additional 2 hours. Unreacted diethanolamine was removed from the reaction product by extraction of the chloroform solution with 20 cc. portions of water. The chloroform solvent was removed from the reaction product by successive distillations at atmospheric pressure, followed by vacuum distillation at 2 mm. Hg absolute pressure. The residue, a highly viscous oily product weighing approximately 36 grams was insoluble in water to any appreciable extent. The above intermediate product is believed to consist almost exclusively of compounds (A and B) of the following structure, in which R'RAr—indicates a dodecyltolyl radical, although compound (B) is believed to represent the structure of a major proportion of the product:

(A) $(R'R-Ar-NHCO-OC_2H_4)_2N-C_2H_4OH$
(B) $R'R-Ar-NHCO-OC_2H_4N=(C_2H_4OH)_2$

The intermediate isocyanate-triethanolamine condensation product prepared as indicated above is converted to a water-soluble product possessing detergent activity in aqueous solution by reacting the intermediate product with 30 molar proportions of ethylene imine in the presence of 1.0% of the reaction mixture of sodium methylate. The above intermediate product is placed in the glass liner of a rotating pressure autoclave together with 1.6 grams of sodium methylate and 132 grams (3.0 moles) of ethylene imine liquefied in the glass liner by cooling the latter to 0° C. A spontaneous reaction occurs when the reactants are mixed and is completed by heating the reaction mixture to 150° C., accompanied by rotating the autoclave. The product solidifies to a waxy solid on cooling to 85° C. and is soluble in water at all concentrations tested below 5% by weight. The product has a detergency in aqueous solution about equal to sodium dodecylbenzene sulfonate at equivalent aqueous concentrations and under otherwise equivalent detergency testing conditions.

Products similar to the above alkylene imine condensation products of dodecyltolylisocyanate with mono-, di- and triethanolamine, varying only slightly in detergency therefrom, may be prepared from the corresponding dodecyltolylisocyanate-mono-, di-, and tripropanolamine intermediates. The amylnaphthalene and octylnaphthalene isocyanate derivatives yield mono-, di-, and triethanolamine condensation products having similar properties to the dodecyltolylisocyanate-mono-, di-, and triethanolamine intermediates, except that the naphthalene derivatives have higher melting points and when condensed with ethylene imine to yield products containing up to 40 alkyleneamino units per molecule, form products possessing surface activity, but of substantially lesser detersive activity in aqueous solution. The latter products are of lesser solubility in water, but dissolve to a greater extent in non-aqueous solvents such as aromatic hydrocarbons, ethylacetate, etc.

We claim as our invention:
A detergent having the following formula:

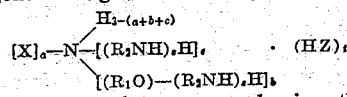

in which X is a urethano group having the structure corresponding to the formula:

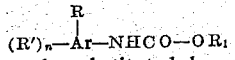

wherein Ar is a poly-substituted benzene hydrocarbon group, R is an alkyl group containing from 8 to about 20 carbon atoms, R' is an alkyl group containing from 1 to 2 carbon atoms, $n$ is a whole number selected from 0, 1 and 2, $R_1$ and $R_2$ are independently selected from divalent alkylene groups containing from 2 to 3 carbon atoms, $a$ is selected from 1 and 2, $b$ and $c$ are selected from 0, 1, and 2, $b+c$ being at least 1, $a+b+c$ being a whole number less than 4, Z is an acid-derived anion, $t$ is selected from 0, 1 and a whole number having a value from 1 to $1+s(b+c)$ and $s$ is a whole number selected from 5 to about 150, further characterized in that the total number of ($R_2$NH) units in said detergent is not greater than about 150.

References Cited in the file of this patent
UNITED STATES PATENTS 2,103,872     Schoeller et al. _____ Dec. 28, 1937

FOREIGN PATENTS 470,181     Great Britain _____ Aug. 3, 1937
536,686     Great Britain _____ Nov. 21, 1940

OTHER REFERENCES

Tallis: Chem. Abs. 36, 1790 (1942).